Figures 1, 2:
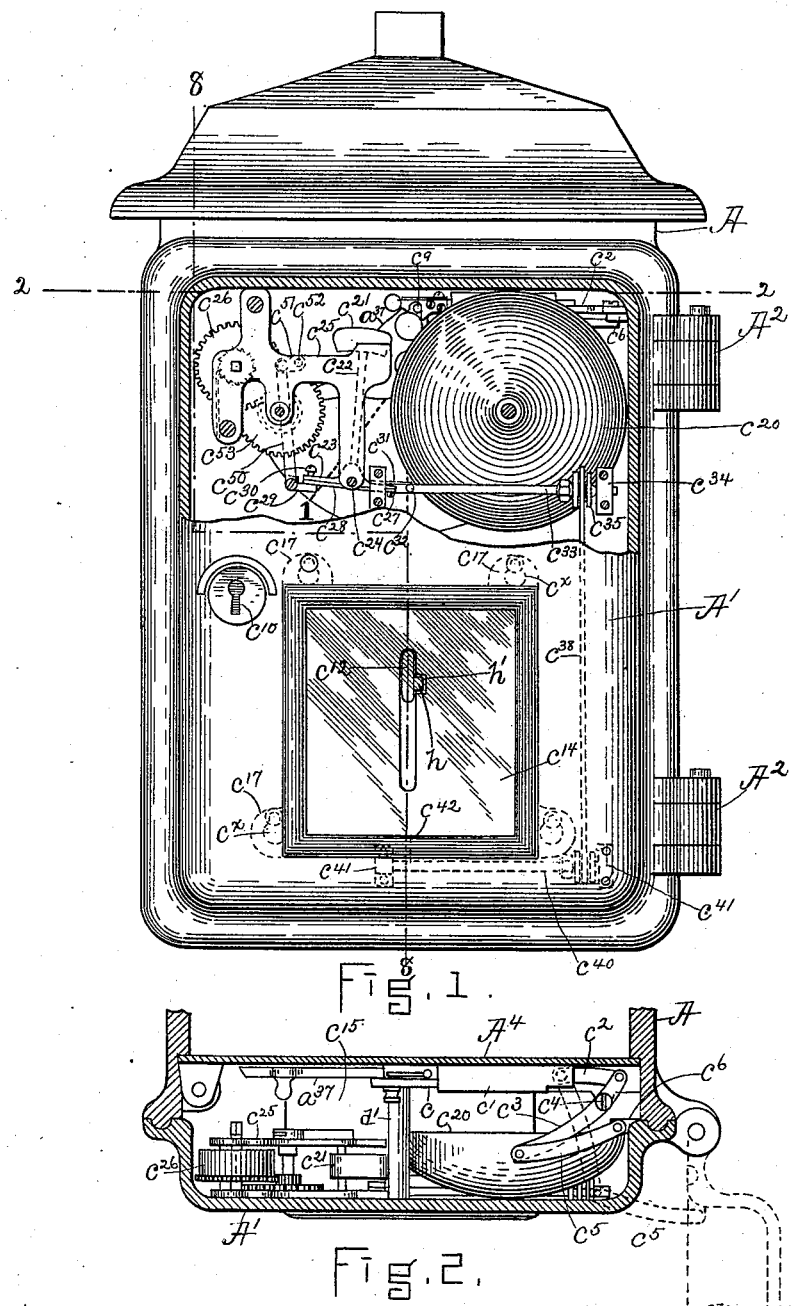

(No Model.) 9 Sheets—Sheet 1.
H. A. CHASE.
SIGNAL TRANSMITTING APPARATUS AND SYSTEM.

No. 540,422. Patented June 4, 1895.

WITNESSES.
Henry Marsh.
J. Murphy.

INVENTOR.
Henry A. Chase
By Jas. H. Churchill
Atty.

(No Model.) 9 Sheets—Sheet 2.
H. A. CHASE.
SIGNAL TRANSMITTING APPARATUS AND SYSTEM.
No. 540,422. Patented June 4, 1895.

WITNESSES.
Henry Marsh.
J. Murphy.

INVENTOR.
Henry A. Chase
By Jas. H. Churchill.
Atty.

THE NORRIS PETERS CO., PHOTO-LITHO., WASHINGTON, D. C.

(No Model.) 9 Sheets—Sheet 3.

H. A. CHASE.
SIGNAL TRANSMITTING APPARATUS AND SYSTEM.

No. 540,422. Patented June 4, 1895.

WITNESSES.
INVENTOR.
Henry A. Chase
By Jas. H. Churchill
Atty (No Model.)  9 Sheets—Sheet 4.

H. A. CHASE.
SIGNAL TRANSMITTING APPARATUS AND SYSTEM.

No. 540,422.  Patented June 4, 1895.

Witnesses.
John F. Nelson.
M. F. Crowley.

Inventor.
Henry A. Chase
by Jas. H. Churchill
Atty.

(No Model.) 9 Sheets—Sheet 5.
H. A. CHASE.
SIGNAL TRANSMITTING APPARATUS AND SYSTEM.

No. 540,422. Patented June 4, 1895.

WITNESSES:
Henry Marsh.
J. Murphy.

INVENTOR:
Henry A. Chase
By Jas. H. Churchill
Atty.

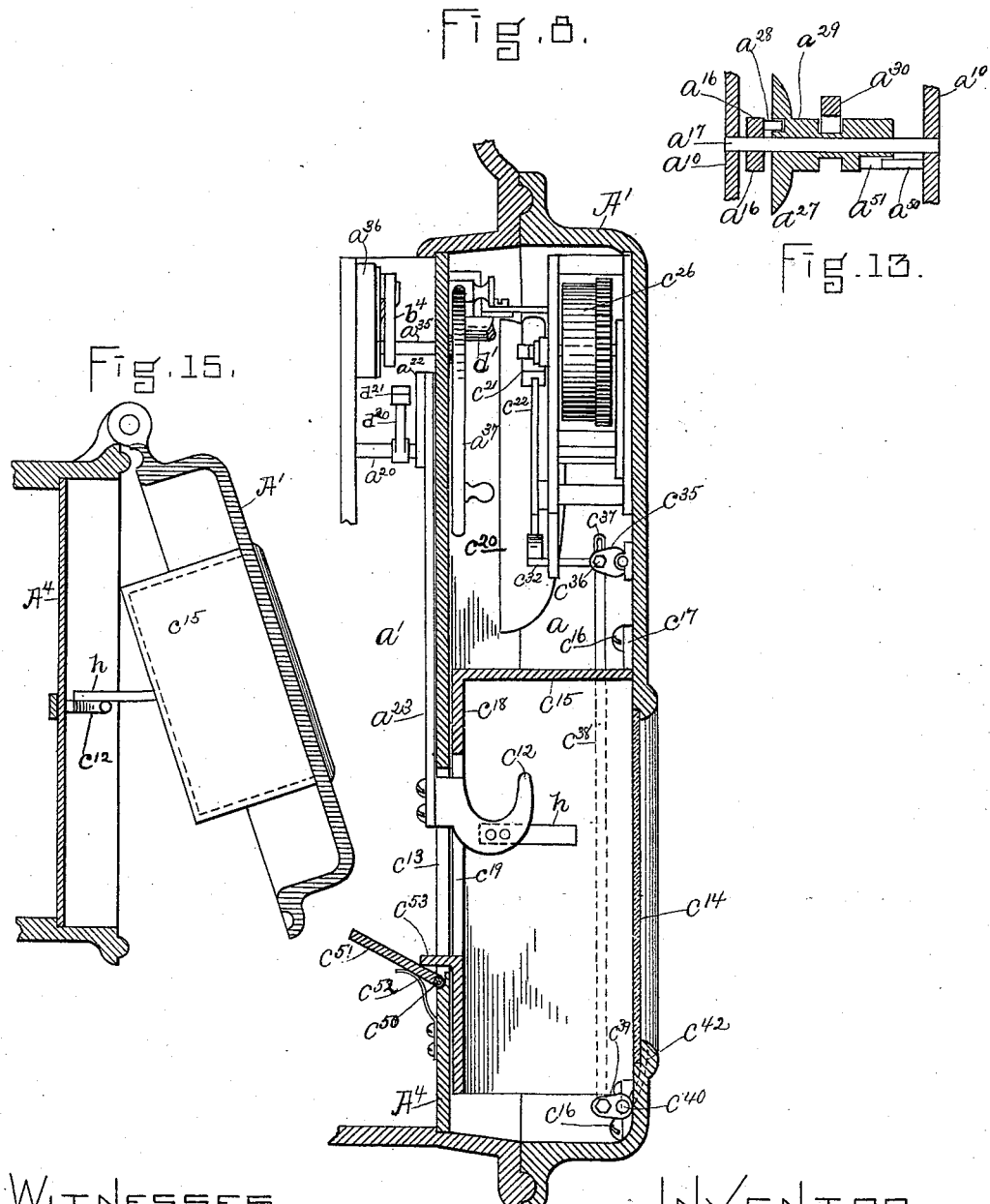

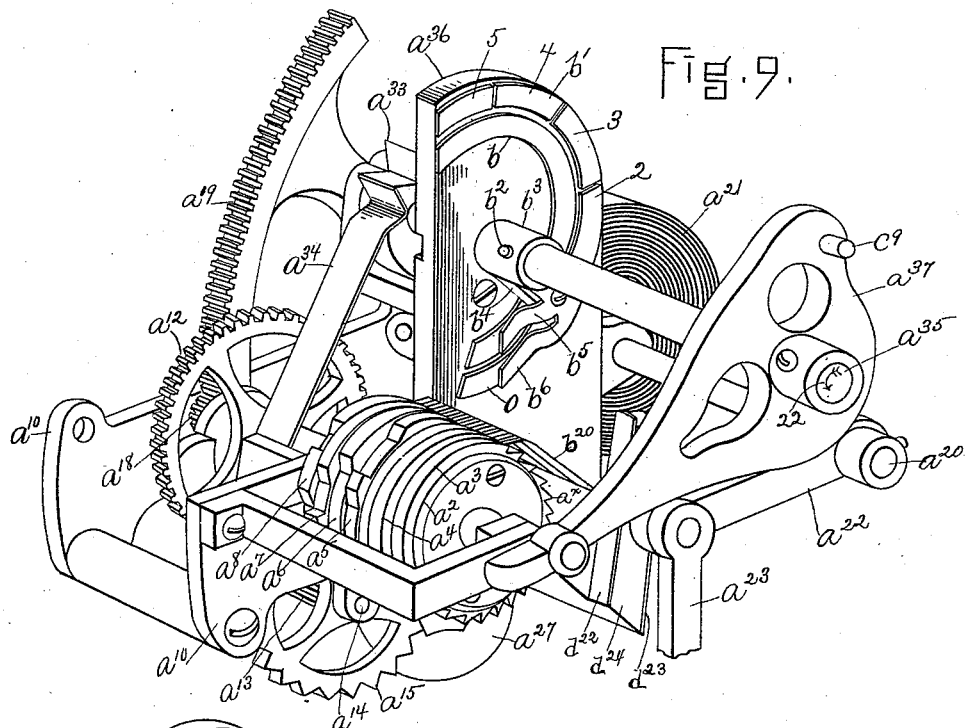
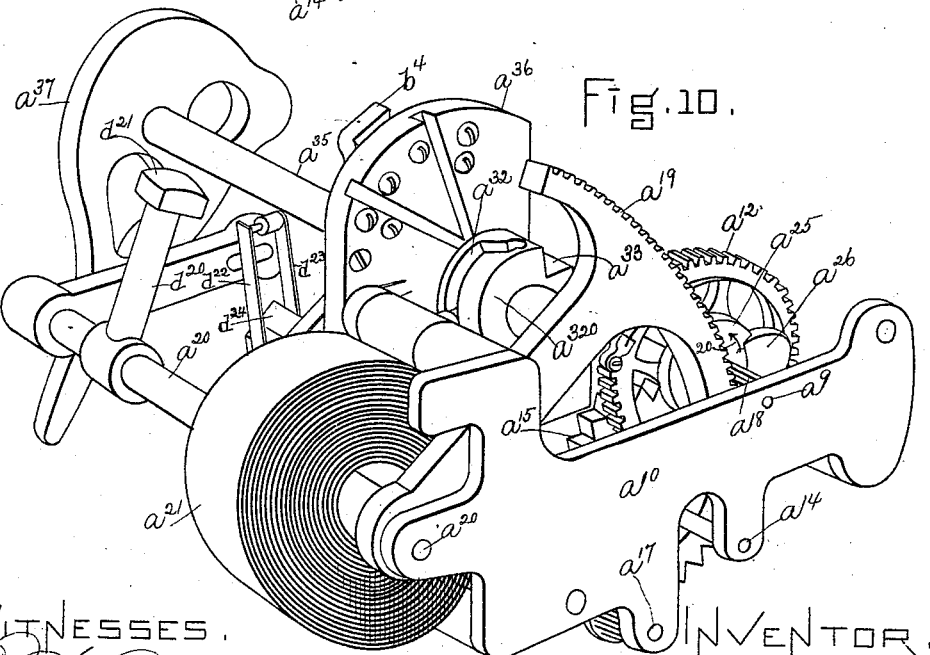

(No Model.)  9 Sheets—Sheet 8.
H. A. CHASE.
SIGNAL TRANSMITTING APPARATUS AND SYSTEM.
No. 540,422. Patented June 4, 1895.
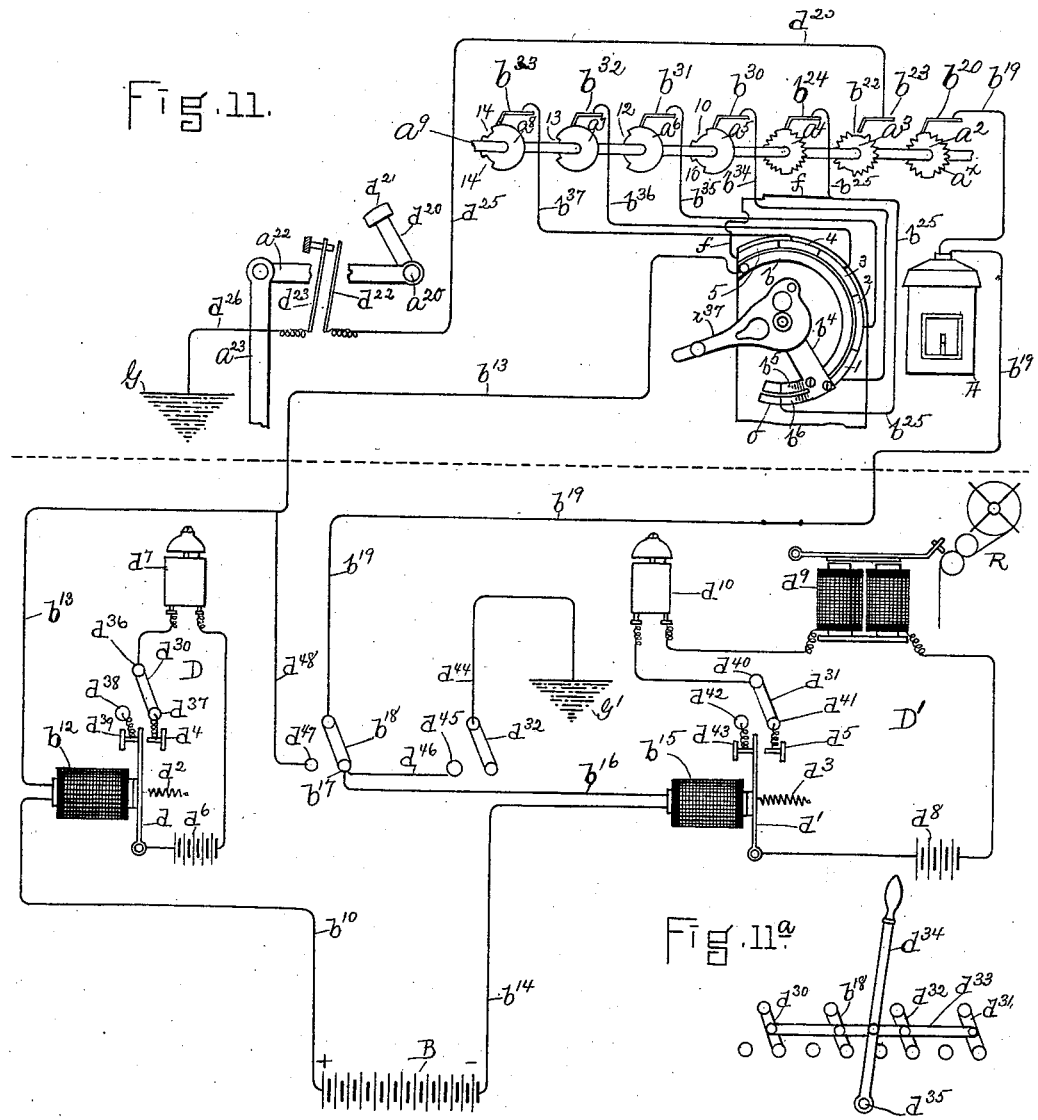
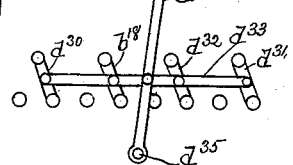
WITNESSES.
INVENTOR.

(No Model.)   9 Sheets—Sheet 9.

H. A. CHASE.
SIGNAL TRANSMITTING APPARATUS AND SYSTEM.

No. 540,422. Patented June 4, 1895.

WITNESSES.
Henry Marsh.
J. Murphy.

INVENTOR.
Henry A. Chase
By Jas. H. Churchill
Atty.

UNITED STATES PATENT OFFICE.

HENRY A. CHASE, OF BOSTON, MASSACHUSETTS, ASSIGNOR, BY MESNE ASSIGNMENTS, TO THE METROPOLITAN DUPLEX FIRE AND POLICE SIGNAL COMPANY, OF PORTLAND, MAINE.

SIGNAL-TRANSMITTING APPARATUS AND SYSTEM.

SPECIFICATION forming part of Letters Patent No. 540,422, dated June 4, 1895.

Application filed September 1, 1892. Serial No. 444,725. (No model.)

*To all whom it may concern:*

Be it known that I, HENRY A. CHASE, of Boston, county of Suffolk, and State of Massachusetts, have invented an Improvement in Signal-Transmitting Apparatus and Systems, of which the following description, in connection with the accompanying drawings, is a specification, like letters and figures on the drawings representing like parts.

This invention relates to a system and apparatus for the transmission of signals, and is especially designed and adapted to be used as a combined fire and police telegraphic system.

Experience has demonstrated, that a fire alarm signal should be transmitted by substantially long interruptions or breaks in the electric circuit, in order to avoid all possible danger of obtaining false signals, whereas in police signal work, it is desirable and in fact necessary, to transmit the signal in a substantially rapid manner, owing to the frequency with which signals are transmitted to the central office or station, which is accomplished by transmitting the signal in a series of shorter interruptions or breaks in the electric circuit.

My present invention has for one of its objects to provide a signal transmitting apparatus or box constructed and arranged as will be described, whereby in the normal condition of the apparatus or box with its door closed, the same is a fire alarm box and the signal or number indicative of the box, may be transmitted in one set of characters, namely, in a series of substantially long interruptions or breaks, to indicate a fire alarm signal, and when the door is opened, the condition of the signal transmitting apparatus is automatically changed, and the apparatus or box transformed into a police signal box, so that when set in operation, the same signal or number will be transmitted in a different or distinguishing set of characters, namely, a series of substantially short interruptions of the electric circuit to indicate a police signal, the said box or apparatus remaining as a police box, as long as the box door is opened.

Another feature of my invention consists in constructing the signal transmitting apparatus as will be described, so that when the door is opened, additional signals may be transmitted in conjunction with the signal or number indicative of the box, to indicate special police signals.

Another feature of my invention consists in a novel construction of the transmitting apparatus as will be described, whereby a grounded circuit is automatically closed in the transmitting apparatus, when the said apparatus is operated to transmit preferably a fire signal, and of a novel construction of receiving apparatus, whereby the full main line battery may be included in a grounded circuit over which the signal may be received in case of a break in either side of the main line, and whereby the main line local circuits, may also be used in connection with and be operated by the grounded circuit, as will be specifically pointed out hereinafter.

Another feature of my invention consists of a novel construction of the box or apparatus, whereby the operating pull or hook is extended into a supplemental case or chamber, secured to or forming part of the box door, and provided at its front side with a transparent frangible covering forming a portion of the box door, whereby when the box door is closed, the transmitting apparatus or box has the appearance of a fire alarm box pure and simple, with the transmitting pull or hook plainly in sight. The box or transmitting apparatus is also provided, as herein shown, with an audible street alarm automatically controlled in its operation by the transparent cover for the supplemental chamber or casing.

Another feature of my invention consists in providing a locking device for the box door to prevent the same being opened, while a fire alarm signal is being transmitted, and another feature consists in providing a stopping device to prevent the box door being closed while a signal is being transmitted.

Other features of my invention will be pointed out in the claims at the end of this specification.

Figure 3:
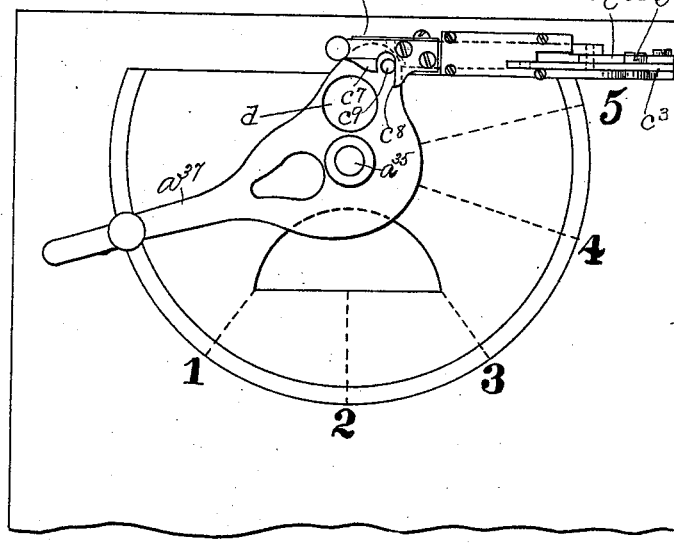
Figure 4:
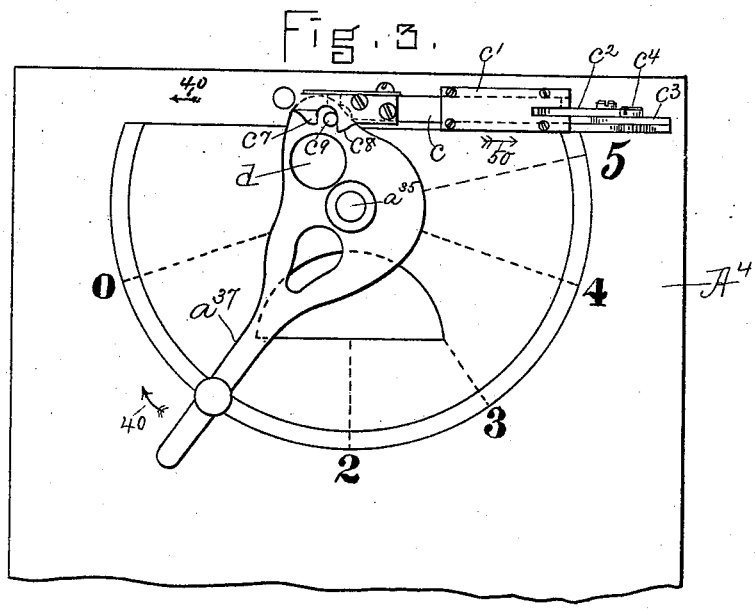
Figure 5:
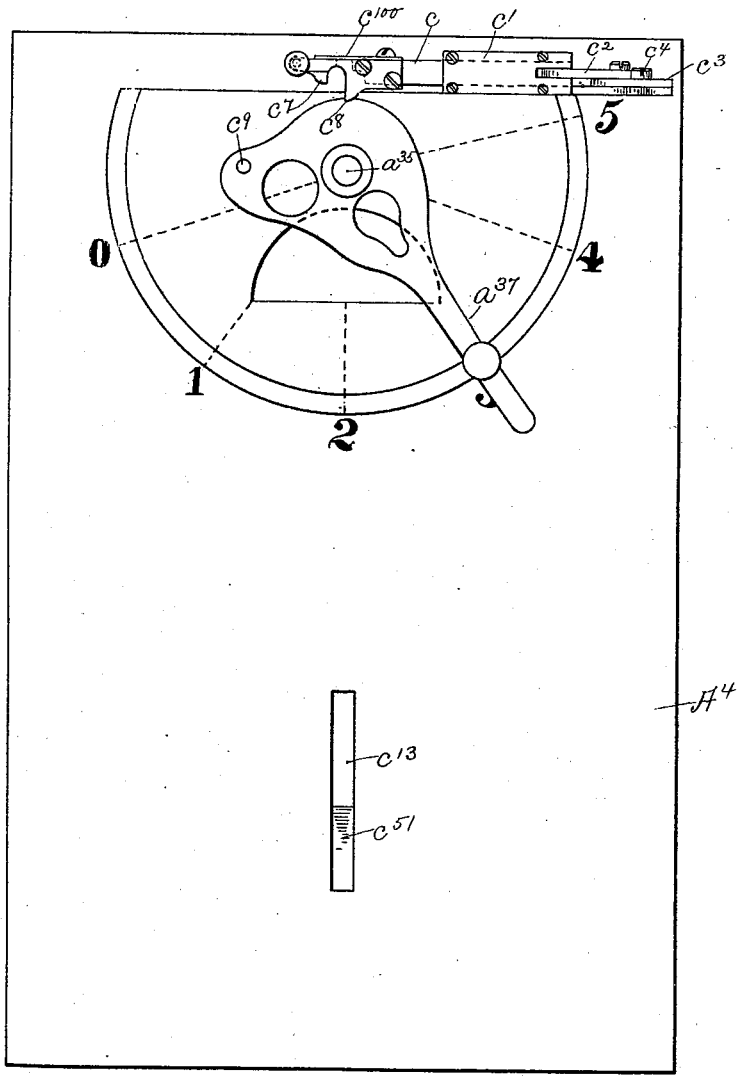
Figure 5A:
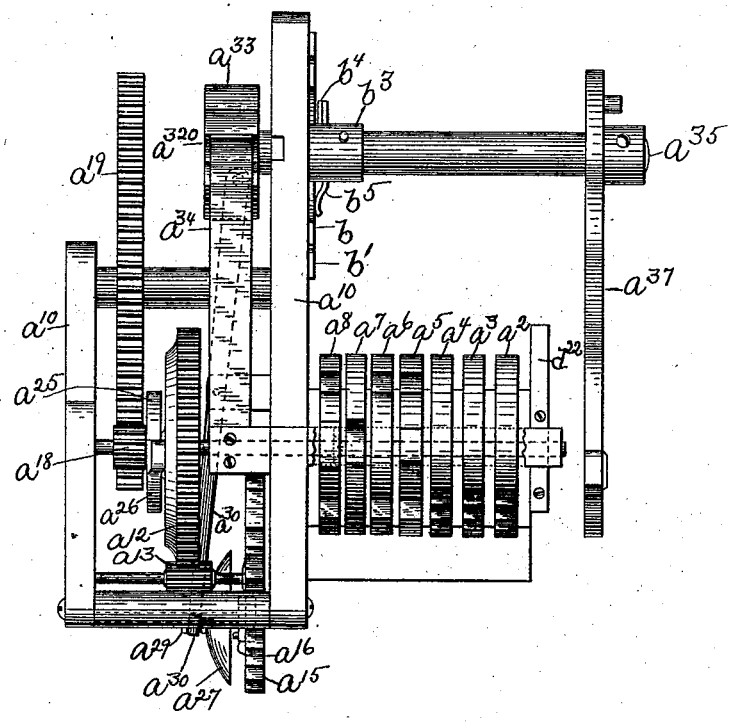
Figure 6:
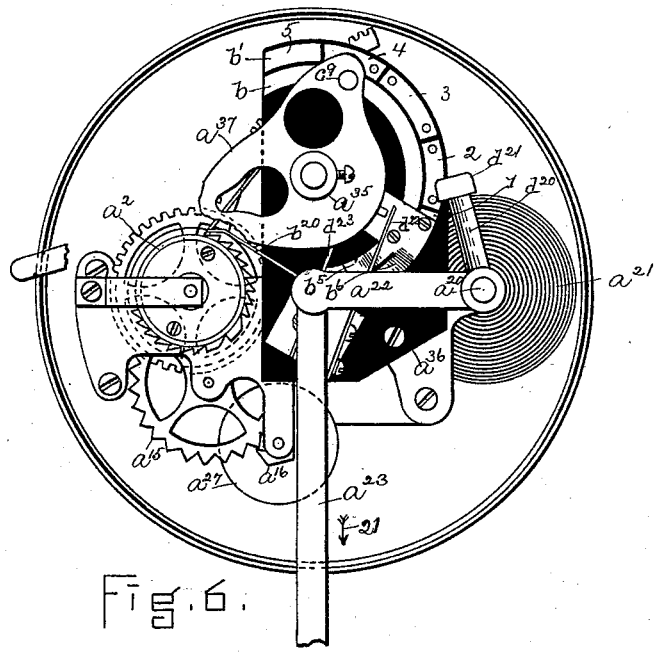
Figure 7:
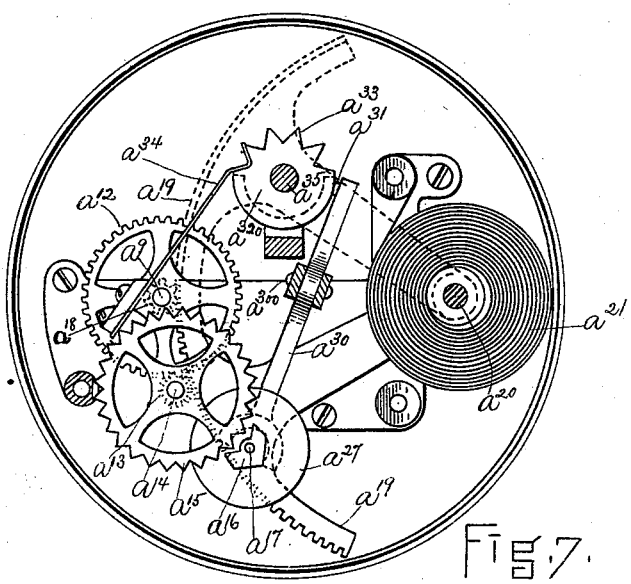
Figures 12, 12A:
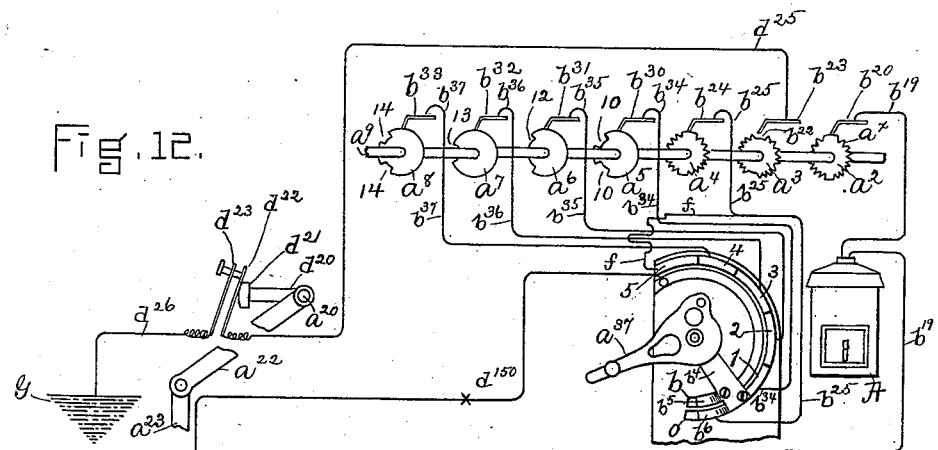

Figure 1 is a front elevation, partially broken out, of a signal-transmitting apparatus or box embodying my invention; Fig. 2, a horizontal section through a portion of the box shown in Fig. 1 on the line 2 2, the box-door being represented by dotted lines in its open position; Fig. 3, a detail in front elevation of the dial, its co-operating pointer, and the mechanism for actuating the pointer, the pointer being shown in its normal position; Fig. 4, a like detail in elevation of the dial, showing the pointer in another position from its normal; Fig. 5, a detail in elevation of the dial, showing the pointer in still another position from that shown in Figs. 3 and 4; Fig. 5$^a$, a detail to be referred to; Fig. 6, a detail in front elevation of the transmitting mechanism located in the box shown in Fig. 1, the transmitting mechanism being shown in its normal position and the co-operating pointer being broken out; Fig. 7, a sectional detail of the transmitting mechanism, it being represented by full lines as in position to transmit a fire-signal; Fig. 8, a vertical section through the box-door and dial-plate of the box shown in Fig. 1, the section being taken on the irregular line 8 8, Fig. 1; Fig. 9, a view in perspective of the movement or transmitting mechanism shown in Fig. 6; Fig. 10, a perspective of the movement shown in Fig. 6, looking from the rear of Fig. 9, with the pointer turned into a different position from that shown in Fig. 9; Fig. 11, a diagram of circuits to enable my invention to be more readily comprehended, the said diagram representing the system in its normal condition for transmitting and recording a fire-alarm; Fig. 11$^a$, a detail to be referred to; Fig. 12, a diagram of circuits, showing the system as transformed into a grounded circuit; Fig. 12$^a$, a detail to be referred to; Fig. 13, a detail of the escapement to be referred to; Fig. 14, a detail of the signals transmitted with the apparatus shown in Fig. 1, and Fig. 15 a detail to more clearly show the stop for preventing the box-door being closed when the actuating-hook is out of its normal position.

Referring to Fig. 1, A represents a transmitting apparatus or box embodying my invention, it being preferably made of iron and provided with the usual door A', which may be secured to the box A by hinges A$^2$ or in any other usual or desired manner.

The box A has located within it a vertical dial plate A$^4$, shown separately in Fig. 5, and which divides the case or shell into two chambers or compartments $a$, $a'$. See Fig. 8.

The transmitting apparatus or box has located within it a signal transmitting mechanism, constructed and arranged as will be described, to transmit its signals in distinct sets of characters, that is, the signal or number indicative of the box is transmitted in a series of long impulses and in a series of short impulses.

The signal transmitting mechanism is preferably constructed to transmit the same signal at different speeds substantially as shown and described in United States Patent No. 472,983, dated April 19, 1892.

The signal transmitting mechanism, shown best in Figs. 9 to 12 inclusive, consists as herein shown, of a series of seven signaling surfaces, preferably break wheels of any usual or well-known construction and marked respectively, $a^2, a^3, a^4, a^5, a^6, a^7, a^8$, the said break wheels being mounted on a shaft $a^9$, having bearings in a suitable frame work $a^{10}$. The break wheel shaft $a^9$ is rotated through gearing herein shown as consisting of a gear wheel $a^{12}$ on the shaft $a^9$, in mesh with a pinion $a^{13}$, see Figs. 5$^a$ and 7, on a shaft $a^{14}$ having bearings in the frame work $a^{10}$, and provided at one end with an escape wheel $a^{15}$, of any usual construction, with which meshes an escape or pallet bar $a^{16}$, loosely mounted on a shaft or arbor $a^{17}$. The break wheel shaft $a^9$ also has loosely mounted on it a pinion $a^{18}$ in mesh with a segmental gear $a^{19}$, mounted on a shaft $a^{20}$, actuated by a motor, shown as a spring $a^{21}$, but which may be a weight, after the manner of the well-known fire alarm transmitting apparatus, the shaft $a^{20}$ having secured to it, an arm $a^{22}$—see Fig. 6, to which the usual pull bar or rod $a^{23}$ is pivotally connected.

The transmitting mechanism is constructed after the usual manner of the fire alarm transmitting mechanism, to permit the actuating pull bar $a^{23}$ to be moved downward without rotating the break wheels, which is accomplished, as herein represented, see Figs. 9 and 10, by means of a toothed or pallet disk $a^{25}$, secured to the pinion $a^{18}$, the said toothed disk engaging a spring pawl $a^{26}$ secured to the gear wheel $a^{12}$. The pawl $a^{26}$ is constructed to permit the toothed disk $a^{25}$ to be revolved in one direction, as indicated by arrow 20 Fig. 10, without actuating the gear wheel $a^{12}$, when the actuating hook or pull bar $a^{23}$ is drawn down in the direction of arrow 21 Fig. 6, but which engages a tooth on the said disk, and rotates the gear $a^{12}$, its shaft $a^9$ and the break wheels, when the segmental gear $a^{19}$ is restored to its normal position by the motor mechanism or spring $a^{21}$.

The motor mechanism referred to, is provided as herein shown, with a speed changing device, herein represented as a disk $a^{27}$, see Figs. 5$^a$, 6, and 7, loosely mounted on the escape shaft $a^{17}$ to slide thereon, and adapted to be coupled to the escape or pallet bar $a^{16}$, by a pin $a^{28}$ on the escape entering a suitable hole or opening in the disk $a^{27}$, the said disk being secured to or forming part of a sleeve $a^{29}$, see Fig. 13, having an annular groove engaged by the forked end of a lever $a^{30}$ pivoted as at $a^{300}$, see Fig. 7, to a portion of the frame work $a^{10}$, and having its other end provided with a stud or projection $a^{31}$ extended into a cam-shaped groove $a^{32}$, see Fig. 10, made in the periphery of the uncut portion of a disk $a^{320}$, provided with teeth $a^{33}$ forming what is technically known as a star wheel, with which co-operates a locking or holding spring $a^{34}$, secured to the frame work $a^{10}$ of the transmitting apparatus. The disk $a^{320}$ is fast upon a shaft $a^{35}$, having bearings in an upright $a^{36}$ secured to the frame work $a^{10}$, and in the dial A$^4$, through which the said shaft is extended, the latter having fastened to it outside of the dial $A^4$, a pointer or indicator $a^{37}$. The upright $a^{36}$ is preferably made of insulating material, and has secured to it a circuit terminal strip or segment $b$, and independent smaller terminal strips or segments $b'$, there being six such terminal strips or segments $b'$ herein shown, and numbered 0, 1, 2, 3, 4, and 5 to correspond with like indications or numbers on the dial $A^4$, see Figs. 3 and 4, and with which latter indications the pointer $a^{37}$ co-operates. The shaft $a^{35}$ has secured to it, as by a screw $b^2$, see Fig. 9, a hub or sleeve $b^3$, having secured to or forming part of it, an arm $b^4$ to which are secured contact brushes or pens $b^5$, $b^6$, electrically connected together in any suitable manner, they being herein represented as formed from a single piece of metal. The pens $b^5$ $b^6$ and the terminal strips $b$, $b'$ form a main line circuit controller.

In the normal condition of the transmitting mechanism, the shaft $a^{35}$ occupies such a position, that the contact brushes or pens $b^5$, $b^6$, make contact with and electrically connect the circuit terminal strip $b$ with the terminal strip $b'$ marked 0, as shown in Figs. 9, 11, and 12, and at such time the lever $a^{30}$ is turned by the cam groove in the disk $a^{320}$, so as to engage the weight or disk $a^{27}$, with the escape or pallet bar $a^{16}$, so that, if the transmitting mechanism should be set in motion, it would run at a substantially slow speed, and a signal indicated by the break wheels $a^2$, $a^3$, $a^4$, would be transmitted to the central station in one set of characters, that is, in substantially long interruptions or breaks in the electric circuit, connecting the transmitting mechanism with the central station.

Referring to Fig. 11, I have represented in diagram the transmitting apparatus as connected in an electrical circuit including a main line battery B, located in the central station, represented by dotted lines, the said battery having one pole, as for instance the positive pole, connected by a wire $b^{10}$, to one coil of an electro-magnet or relay $b^{12}$, having the other end of its coil connected by wire $b^{13}$ with the circuit terminal strip or segment $b$, the other pole of the battery B being connected by wire $b^{14}$ to one end of the coil of an electro-magnet or relay $b^{15}$, having the other end of its coil connected by a wire $b^{16}$ to a circuit terminal stud or button $b^{17}$, with which co-operates a circuit controller or switch $b^{18}$, shown as a pivoted lever, having its pivot connected by wire $b^{19}$ to a contact pen or brush $b^{20}$, co-operating with the break wheel $a^2$, the wire $b^{19}$ as represented in Fig. 11 including a second box or apparatus A. The break wheel $a^2$ is provided on its periphery with a series of teeth or notches $a^x$, indicative of the number of the transmitting apparatus or box, which in the present instance is 99. The break wheels $a^3$, $a^4$ are likewise provided, as herein represented, with the same number of teeth, and the break wheel $a^4$ is precisely the same as the break wheel $a^2$, whereas the break wheel $a^3$ differs from the wheels $a^2$ $a^4$, in that it is provided on its periphery with a substantially long notch $b^{22}$, whereas the break wheels $a^2$ $a^4$ have their peripheries unnotched with the exception of the teeth $a^x$. The break wheels $a^3$ $a^4$ have co-operating with them contact pens or brushes $b^{23}$, $b^{24}$, the contact pen $b^{24}$ being connected by a branch wire $b^{25}$ to the zero circuit terminal $b'$ of the main line circuit controller located in the box. The contact pens or brushes $b^{23}$ $b^{24}$ are permanently in engagement with the periphery of the break wheels $a^2$ $a^4$, when the said break wheels are in their normal condition, while the contact pen or brush $b^{23}$ is preferably out of contact with the break wheel $a^3$.

In practice the break wheels $a^2$, $a^3$, $a^4$ are secured upon the shaft $a^9$ with their teeth in coincidence, so that, in the revolution of the break wheel shaft $a^9$, the teeth of all the break wheels $a^2$, $a^3$, $a^4$, make contact with their co-operating contact pens or brushes, simultaneously as one wheel.

The remaining break wheels $a^5$, $a^6$, $a^7$, $a^8$, shown in diagram in Figs. 11 and 12 have co-operating with them respectively, contact pens or brushes $b^{30}$, $b^{31}$, $b^{32}$, $b^{33}$, respectively connected by branch wires $b^{34}$ $b^{35}$ $b^{36}$ and $b^{37}$, to the circuit terminal segments $b'$ marked respectively 1, 2, 3, and 4.

The break wheels $a^5$, $a^6$, $a^7$, $a^8$, are provided with one or more teeth or notches on their peripheries, which co-operate with the main signal or box number as will be described, to indicate a special signal, and in the present instance, the break wheel $a^5$ is provided with two substantially long notches 10, the break wheel $a^6$ with one substantially long notch 12, the break wheel $a^7$ with one substantially short notch 13, and the break wheel $a^8$ with two substantially short notches 14 substantially widely separated.

With the pointer $a^{37}$ in its normal or zero position shown in Figs. 3 and 11, the transmitting mechanism, if set in operation, would transmit the signal or box number as will be described, in a series of long interruptions or breaks, due in the present instance to the substantially slow rate of movement of the motor mechanism, but if the pointer $a^{37}$ should be moved to any other indication on the dial, as for instance, to the indication marked 1, the shaft $a^{35}$ would be rotated in the direction indicated by arrow 22 Fig. 9, and the lever $a^{30}$ turned on its pivot $a^{300}$, so as to withdraw the disk or weight $a^{27}$ from engagement with the pin $a^{28}$ on the escape $a^{16}$, thereby permitting the transmitting mechanism to be operated at a substantially high rate of speed. The disk $a^{27}$, when disengaged from the pin $a^{28}$, is kept in correct position to permit the pin $a^{28}$ to enter the opening in the disk $a^{27}$, when restored to its normal position, by a guiding pin or stud $a^{50}$, see Fig. 13, extended into a slot $a^{51}$ in the hub $a^{29}$. When the pointer has been moved to register with the indication marked 1 on the dial, the contact pens $b^5$ $b^6$ will be moved so as to electrically connect the terminal strip or segment $b$ with the terminal strip or segment $b'$ marked 1.

If the transmitting mechanism should be set in operation when the pointer registers with the indication 1 on the dial, the box number indicated by one of the wheels $a^2$, $a^3$, $a^4$, will be transmitted to the central office in a different set of characters from those in which the box number is transmitted, with the pointer in its normal position, and as herein represented an additional signal indicated by the notches or teeth 10 in the break wheel $a^5$ will also be transmitted.

One of the objects of my present invention is to effect a change in the condition of the transmitting mechanism by the opening of the box door $A'$, so that when the said transmitting mechanism is operated, the character of the signal is changed, and I accomplish this feature of my invention, by an intermediate connection as will be described, which in the present instance couples the box door $A'$ with the pointer $a^{37}$.

The intermediate connection referred to, consists essentially as herein shown, of a sliding bar or rod $c$,—see Figs. 2 and 5, movable in a suitable guide $c'$ secured to or forming part of the dial $A^4$, the sliding rod $c$, as shown in Fig. 2, being joined by a link $c^2$ to one end of a lever $c^3$, pivoted as at $c^4$ and having its end connected by a link $c^5$ to a boss or projection $c^6$ on the inside of the door $A'$. The sliding bar $c$ is detachably connected to the pointer $a^{37}$, it being provided with fingers or projections $c^7$, $c^8$, adapted to engage a stud or projection $c^9$ on the said pointer. The finger $c^8$ is made rigid and also is longer than the finger $c^7$ for a purpose as will be described, and the finger $c^7$ is preferably made movable or as a pivoted member, which is normally pressed down into its operative position by a flat spring $c^{100}$ secured to the top of the slide bar $c$, the finger $c^7$ being made movable for a purpose as will be described.

In the normal condition of the box or transmitting apparatus, the pointer $a^{37}$ occupies the position shown in Fig. 3, it registering with the 0 indication on the dial, and at such time the box door $A'$ is closed, and the lever $c^3$ and links $c^2$, $c^5$, occupy the full line position shown in Fig. 2. When the box door $A'$ is closed, it may and preferably will be locked by means of a key, not shown, inserted into a key hole $c^{10}$. See Fig. 1. When the box door $A'$ is locked, the signal transmitting mechanism may and preferably will be set in operation by pulling upon a hook $c^{12}$ extended through a slot $c^{13}$ in the dial $A^4$, the said hook being secured to the pull bar $a^{23}$.

In order to render the hook $c^{12}$ accessible, when the box door is closed, the said door is provided, as herein shown, with a substantially large opening normally covered by a frangible covering $c^{14}$, preferably a pane of glass through which the operating hook may be plainly seen.

To still further characterize the box or transmitting apparatus as a fire alarm box when the door $A'$ is closed, the said door has secured to or forming part of its rear side, a frame or casing $c^{15}$—see Fig. 8, preferably detachably secured to the box door $A'$, by screws $c^{16}$ extended through suitable openings or holes $c^x$ in lugs $c^{17}$ secured to or forming part of the casing $c^{15}$. The holes or openings $c^x$ are preferably made oblong, so that the box casing $c^{15}$ may be slipped off the screws when the box door is opened, if it is desired to remove the same.

The casing or frame $c^{15}$ is preferably provided, as shown, with a rear wall $c^{18}$ having a vertical slot $c^{19}$ through which the hook $c^{12}$ extends into the casing, and preferably with a substantially horizontal notch $h'$, for a purpose as will be described. The interior of the casing $c^{15}$ may be painted red or any other color to clearly identify this particular portion of the combination box with the ordinary fire alarm box, which is usually painted red, and in addition the rear wall of the casing may be provided with suitable words designating the manner in which the box is to be operated in case of fire. By extending the operating hook $c^{12}$ into the casing $c^{15}$ and providing the latter with suitable directions for operating the hook, and also by rendering the said hook visible by means of the pane of glass $c^{14}$, ordinary persons can readily see what is to be done in case they desire to send a fire alarm signal, thereby avoiding confusion on the part of such persons operating the fire alarm and saving valuable time in the beginning of a fire, which in practice means a quicker response of the fire department, thereby oftentimes effecting a saving of human lives as well as property.

In order to deter mischievous and unauthorized persons from breaking the glass $c^{14}$ and reaching the hook to send in a fire alarm signal, the box or apparatus is provided with an audible street alarm, automatically controlled by the breaking of the frangible covering $c^{14}$ substantially as shown and described in United States Patent No. 465,989, granted to me December 29, 1891.

The audible street alarm, as shown in Figs. 1 and 8, is attached to the back of the door $A'$ above the casing $c^{15}$, and consists essentially, as herein shown, of a gong or bell $c^{20}$ and a striker $c^{21}$ secured to a bar or rod $c^{22}$ fastened to a spring actuated lever $c^{23}$, pivoted on a shaft or arbor $c^{24}$ having bearings in the frame work $c^{25}$ of a clock or motor mechanism $c^{26}$, the lever $c^{23}$ being fastened at one end as by a screw $c^{27}$, to a flat spring $c^{28}$, having its other end secured to a crank or arm $c^{29}$, by set screw $c^{30}$, which is extended through a slot in the lever $c^{23}$, so that that end of the said lever is free to rise and fall. The shaft $c^{24}$ has secured to it, as shown, a substantially horizontal arm $c^{31}$, normally resting on an arm or projection $c^{32}$ on the rock shaft $c^{33}$, having bearings in suitable lugs $c^{34}$ and provided with one or more crank arms $c^{35}$, see Fig. 8, having a crank pin $c^{36}$ engaged by and extended through a slot $c^{37}$ in the end of an upright link $c^{38}$, secured at its lower end to a crank $c^{39}$ on a rock shaft $c^{40}$, having bearings in suitable lugs $c^{41}$ attached to the box door—see Fig. 1, the rock shaft $c^{40}$, having an upright finger $c^{42}$ which is normally engaged by the frangible covering $c^{14}$, to hold the pin or arm $c^{32}$ in its elevated position until the glass $c^{14}$ has been broken. The crank or arm $c^{29}$ is connected by link $c^{50}$ to a crank $c^{51}$, fast on a shaft $c^{52}$ having a pinion, not shown, but which meshes with a gear $c^{53}$ of the clock or motor mechanism.

When the glass $c^{14}$ is broken, the link $c^{38}$ falls downward and moves the rock-shaft $c^{33}$, so as to carry the pin or arm $c^{32}$ down and out of engagement with the rod or arm $c^{31}$, thereby permitting the clock or motor mechanism, which is normally wound up, to start and actuate the striker, thereby sounding the bell $c^{20}$ and giving an alarm to persons in the vicinity of the box, that the frangible covering has been broken. When the motor is started, it revolves the crank $c^{51}$, and rocks the lever or arm $c^{29}$ up and down, which motion is transmitted by the spring $c^{28}$ to the farther end of the lever $c^{23}$, viewing Fig. 1, and rocks the said lever so as to bring the striker $c^{21}$ into contact with the bell $c^{20}$.

In the normal condition of the transmitting apparatus or box, the door A' is closed and locked, and the operating parts of the transmitting mechanism are in the position shown in the diagram Fig. 11, the pointer $a^{37}$ registering with the 0 indication on the dial $A^4$, and the stud or projection $c^9$ being engaged by the fingers $c^7$ $c^8$. When in this condition, the box or transmitting apparatus forms a fire alarm box, and may be operated by breaking the frangible cover $c^{14}$ and pulling the hook $c^{12}$ to the bottom of its slot $c^{13}$, which action moves the segmental gear $a^{19}$ into the full line position shown in Fig. 7, so that, when the hook is released, the gear $a^{19}$ is returned to its normal position shown in Fig. 6, by the spring $a^{21}$, and the break wheel shaft $a^9$ is rotated, preferably three times, that is, the break wheel shaft makes three complete revolutions to send in what is technically called three rounds of the signal, indicated by the break wheels $a^2$ $a^3$ $a^4$, which is the same signal in each case, namely, the number indicative of the box. In the revolution of the break wheel shaft $a^9$, the normally closed metallic circuit is open at the teeth or notches $a^x$ on the periphery of the wheels $a^2$, $a^4$, and the circuit interrupted, thereby permitting the armatures $d$—$d'$ of the relays $b^{12}$, $b^{15}$, to be withdrawn by their retractile springs $d^2$, $d^3$, into contact with their co-operating back stops $d^4$, $d^5$, thereby closing the normally open local circuits D—D' controlled by said relays. The local circuit D includes in it a local battery $d^6$ and a signal receiving instrument, preferably a tap bell $d^7$, of any well-known construction, while the local circuit D' includes a local battery $d^8$, and a message recording apparatus R, shown as a register of any ordinary construction, having its electro-magnet $d^9$ included in the local circuit D', the said local circuit D' also including in it, as herein shown, an audible signal receiving instrument or tap bell $d^{10}$. At each break in the metallic circuit, occasioned by a tooth on the wheels $a^2$ $a^4$, the relays $b^{12}$, $b^{15}$ are demagnetized and the local circuits D—D' are closed, thereby operating the audible alarms $d^7$, $d^{10}$, and the register R, upon which latter the signal indicated by the box number is permanently recorded.

The signal transmitted by the break wheels $a^2$ $a^4$ with the box door closed as described, constitutes the fire alarm signal, and, as has been described, is transmitted from the box or apparatus to the central station three times in succession, that is, one operation of the hook transmits three rounds of the box number.

In the normal condition of the apparatus, the signal transmitted to the receiving station is sent over a normally closed metallic circuit, which may be traced as follows, viz:—from the positive pole of the battery B by wire $b^{10}$ to the relay $b^{12}$, thence by the wire $b^{13}$ to the conducting strip or segment $b$, thence by the pens or brushes $b^5$ $b^6$ to the conducting segment $b'$ marked 0, thence by the branch wire $b^{25}$ to the pen $b^{24}$ co-operating with the break wheel $a^4$, through the break wheel $a^4$ and shaft $a^9$ to the break wheel $a^2$, thence by its co-operating pen $b^{20}$, wire $b^{19}$, and switch lever $b^{18}$, to the terminal stud $b^{17}$, thence by wire $b^{16}$, relay $b^{15}$, and wire $b^{14}$ to the negative pole of the battery.

In order to increase the efficiency of the fire alarm service by increasing the chances for receiving the signal in case of a break in either side of the line or metallic circuit, as, for instance, in case of a break in the line wire $b^{19}$, as represented at $d^{15}$, Fig. 12, the transmitting mechanism of the box or apparatus, is provided as herein shown with a circuit controller, actuated by the pull bar $a^{23}$, the said circuit controller being shown as an arm $d^{20}$, see Figs. 10 and 11, fast on the shaft $a^{20}$, and provided at its outer end with a projection $d^{21}$ having, as shown, a convexed surface, which co-operates with circuit terminals $d^{22}$—$d^{23}$, secured to an insulating support or block $d^{24}$ fastened to the frame work $a^{10}$, of the transmitting mechanism, the circuit terminals $d^{22}$ $d^{23}$ being normally separated or electrically disconnected as represented in Fig. 11. The circuit terminals $d^{22}$ $d^{23}$ are included in or form a part of a grounded branch circuit, which is normally open at the said circuit terminals. The circuit terminal $d^{22}$ is connected by wire $d^{25}$ to the pen $b^{23}$ co-operating with the break wheel $a^3$, and the circuit terminal $d^{23}$ is connected by wire $d^{26}$ to the ground G.

The circuit controller $d^{20}$, operated by the pull bar $a^{23}$ is preferably constructed and so secured to the shaft $a^{20}$, as to be brought into contact with the circuit terminal $d^{22}$ at the end of the downward movement of the pull bar $a^{23}$ and hook $c^{12}$, and to remain in contact with the circuit terminal $d^{22}$, while the break wheel $a^9$, is making its first complete revolution, so that the grounded branch circuit at the box will be closed between the terminals $d^{22}$ $d^{23}$ during one complete revolution of the break wheels, preferably during the first complete revolution.

In the normal condition of the transmitting apparatus, the contact pen $b^{23}$ is out of contact with the break wheel $a^3$, and the grounded branch is also open at this point, but as soon as the break wheel shaft commences to rotate, the pen $b^{23}$ makes contact with a tooth or raised portion of the break wheel $a^3$, to close the grounded branch, and as the break wheel $a^3$ is rotated, the raised portions or teeth pass from under the contact pen $b^{23}$, and open the grounded branch circuit at the break wheel, while the same is maintained closed at the circuit terminals $d^{22}$ $d^{23}$, the said terminals being held in contact with each other by the circuit controller $d^{20}$, until the break wheel shaft has made a complete revolution. When a break occurs in either side of the main line or metallic circuit, such as at $d^{15}$, in the line wire $b^{19}$, the relays $b^{12}$, $b^{15}$, are demagnetized, and the local circuits D, D', closed, thereby operating the register and bells at the central station, and notifying the operator therein that a break has occurred in the line. In order to again complete a circuit for the relays $b^{12}$, $b^{15}$, over the unbroken line wire, and at the same time to employ the same receiving instruments in the local circuits upon which the signal is received when transmitted over the metallic circuit, and also to utilize the same metallic circuit battery without change, I have provided a series of switches $d^{30}$, $d^{31}$, $d^{32}$, and $b^{18}$, preferably connected together as by a bar $d^{33}$, joined to an actuating lever $d^{34}$ pivoted as at $d^{35}$, so that all the switches may be operated in unison or simultaneously by moving the lever $d^{34}$.

The switches $d^{30}$, $d^{31}$, are included in the local circuits D and D', the switch $d^{30}$ being pivoted as at $d^{36}$ and co-operating with studs or terminals $d^{37}$, $d^{38}$, connected respectively to the back stop $d^4$ and the front stop $d^{39}$ for the armature $d$ of the relay $b^{12}$, while the switch $d^{31}$ is pivoted as at $d^{40}$ and co-operates with the terminal studs $d^{41}$ $d^{42}$, connected respectively to the back stop $d^5$ and front stop $d^{43}$ of the armature $d'$ of the relay $b^{15}$. The switch $d^{32}$ is connected by a wire $d^{44}$ to a ground G' located in the central office or station, and is adapted to be brought in contact with a terminal stud $d^{45}$, joined by wire $d^{46}$ to the terminal stud $b^{17}$, with which the switch $b^{18}$ co-operates, when the metallic circuit is unbroken or in its normal condition, as represented in Fig. 11, the switch $b^{18}$ being adapted to be moved into contact with a terminal stud $d^{47}$, joined by wire $d^{48}$ to the wire $b^{13}$.

In the normal condition of the main line circuit, that is, when the said circuit is complete as a metallic circuit and its line wires are unbroken, the switches occupy the position shown in the diagram Fig. 11, that is, the main line switch $b^{18}$ is in contact with the terminal stud $b^{17}$ to complete the main line, and the switches $d^{30}$, $d^{31}$, of the locals D—D' are in contact respectively with the terminals $d^{37}$, $d^{41}$, connected to the back stops $d^4$, $d^5$, for the armatures of the relays $b^{12}$, $b^{15}$, the grounded circuit switch $d^{32}$ being at such time disconnected from its co-operating terminal $d^{45}$, to open the grounded branch circuit at the central station.

If a break should occur in one of the main lines, as for instance, at $d^{15}$, Fig. 12, the relays $b^{12}$, $b^{15}$ become demagnetized and their armatures are withdrawn against their back stops $d^4$, $d^5$. As soon as the relays become demagnetized, the register is started and notifies the operator, by making a long dash upon its tape, that the line is broken. The operator then moves the switch lever $d^{34}$ into the position shown in Fig. 12$^a$, thereby throwing the switches $d^{30}$, $d^{31}$, $d^{32}$ and $b^{18}$ into the positions shown in Fig. 12, the switch $d^{30}$ being brought in contact with the terminal stud $d^{38}$ connected to the front stop $d^{39}$ for the armature $d$, and the switch $d^{31}$ being brought into contact with the stud $d^{42}$ connected to the front stop $d^{43}$ for the armature $d'$, and the main line switch $b^{18}$ being connected to the terminal stud $d^{47}$, and the ground switch $d^{32}$ being brought into engagement with its co-operating stud or terminal $d^{45}$. With the apparatus in the central station in this condition, the circuit is transformed or converted from a metallic into a grounded circuit normally open at the transmitting apparatus, namely, between the contact pen $b^{23}$ and the break wheel $a^3$, and between the circuit terminals $d^{22}$, $d^{23}$. When the pull bar $a^{23}$ is operated to transmit a fire alarm signal, the grounded circuit is closed between the terminals $d^{22}$, $d^{23}$, by the circuit controller $d^{20}$ as described and in the present instance, remains open between the break wheel $a^3$ and its co-operating pen $b^{23}$, until the pull bar $a^{23}$ is released by the operator and the break wheel $a^3$ is set in rotation. As soon as the wheel $a^{23}$ is set in rotation, its teeth or raised portions are successively brought into engagement with the contact pen $b^{23}$, and the grounded circuit momentarily closed, thereby energizing the relays $b^{12}$ $b^{15}$, which attract their armatures $d$, $d'$, into contact with their front stops $d^{39}$ $d^{43}$, thereby closing the local circuits D, D'. In this manner the box number indicated by the teeth on the break wheel $a^3$, which are precisely the same as the teeth on the break wheels $a^2$ $a^4$, is received upon the signal receiving instrument $d^7$ in the local circuit D, and also upon the signal receiving instrument, $d^{10}$, and the register R, in the local circuit D'.

It will be noticed, that when the metallic circuit is converted into a grounded circuit as just described, the battery B remains unchanged, and also that the metallic circuit receiving instruments in the local circuits are employed without change, to receive the signal when transmitted over the grounded circuit.

The grounded circuit referred to may be traced as follows, viz: from the positive pole of the battery B by wire $b^{10}$, relay $b^{12}$, wire $b^{13}$, contact strip or segment $b$, contact brushes $b^5$ $b^6$, contact segment $b'$ marked 0, wire $b^{25}$, contact pen $b^{24}$, break wheel $a^4$, shaft $a^9$, break wheel $a^3$, contact pen $b^{23}$, wire $d^{25}$, terminals $d^{22}$, $d^{23}$, and wire $d^{26}$ to the ground G, from thence to the ground G', wire $d^{44}$, switch $d^{32}$, wire $d^{46}$, terminal stud $b^{17}$, wire $b^{16}$, relay $b^{15}$, and wire $b^{14}$ to the negative pole of the battery.

The signal is transmitted over the grounded circuit just described, when the break occurs in one side of the line, as at $d^{15}$, but in case a break should occur in the left of the line, as at the point marked $d^{150}$, Fig. 12, the signal would be transmitted over a grounded circuit including the right of the line, which may be traced as follows, viz: from the positive pole of the battery B by wire $b^{10}$, relay $b^{12}$, wire $b^{13}$, wire $d^{48}$, switch $b^{18}$, wire $b^{19}$ to contact pen $b^{20}$, break wheel $a^2$, shaft $a^9$, break wheel $a^3$, contact pen $b^{23}$, wire $d^{25}$, circuit terminals $d^{22}$, $d^{23}$, wire $d^{26}$ to ground G, thence to the ground G', wire $d^{44}$, switch $d^{32}$, wire $d^{46}$, terminal stud $b^{17}$, wire $b^{16}$, relay $b^{15}$, wire $b^{14}$ to the negative pole of the battery B.

When the box door A' is closed, the signal transmitted from the said box to the central station by breaking the frangible covering $c^{14}$ and operating the hook $c^{12}$, is received in the central station in a series of substantially long interruptions or breaks, the relays $b^{12}$ $b^{15}$ both responding to the signal transmitted, which has been described as a fire alarm signal. The relay $b^{12}$ is constructed so as to respond only to substantially long breaks in the circuit, whereas the relay $b^{15}$ is constructed so as to respond to substantially short breaks or interruptions in the circuit as well as to long breaks, the said relays being respectively designated by me as the slow and fast relays.

In order that the transmitting apparatus or box may be used for other purposes than a fire alarm box, as for instance as a police signal box, the signal transmitting mechanism is constructed and arranged to transmit the signal indicative of the box, which in the normal condition of the box with its door closed, is the fire alarm signal, in a series of substantially short impulses, which operate the fast relay $b^{15}$, and do not operate the slow relay $b^{12}$, the signal transmitted being received upon the register R, in a series of substantially short marks, and as herein represented being also received upon the bell $b^{10}$, in a series of substantially short or sharp blows.

The change in the transmitting mechanism from a series of long interruptions to a series of short interruptions, is preferably accomplished by means of the speed changing device above described, and in order to render this change positive and obligatory, the pointer $a^{37}$ is moved from its normal position shown in Fig. 3 to the position shown in Fig. 4 by the opening of the box door A', the said pointer being automatically turned into the position shown in Fig. 4, when the door is opened, by the finger $c^8$ acting against the stud or projection $c^9$ on the said pointer.

When the pointer $a^{37}$ is moved from the 0 indication on the dial $A^4$ to the indication marked 1 as shown in Fig. 4, the shaft $a^{35}$ is rotated one tooth of the star wheel or disk $a^{320}$, and the lever $a^{30}$ is turned by the cam groove $a^{32}$ in the said disk, so as to slide the weighted disk $a^{27}$ on the escape shaft $a^{17}$, and withdraw the said disk $a^{27}$ from engagement with the escape $a^{16}$, thereby leaving the latter free from its retarding influence, and permitting the motor mechanism to operate at a substantially high rate of speed, so that if the hook $c^{12}$ should be operated with the box door open, the break wheel shaft $a^9$ and its break wheels mounted thereon, will be rotated at a substantially high rate of speed, and thereby cause the signal indicated by the break wheels $a^2$, $a^3$, $a^4$, to be transmitted to the central station in a series of substantially short impulses or breaks, which are received only upon the fast relay $b^{15}$, the slow relay $b^{12}$ remaining in its normal condition.

The signal indicated by the box number alone, that is, by the break wheels $a^2$ $a^3$ $a^4$, when transmitted in a series of substantially short impulses may and preferably will indicate a test signal, as will be described, but in order to more distinctly particularize any special signal in police work, I prefer to employ an additional signal in conjunction with the box number transmitted in a series of substantially short impulses.

Among the more important signals employed in police work, is what is known as the wagon call, which in the present instance may be supposed to be the box number transmitted in a series of short impulses and two substantially long impulses or breaks in addition to the box number. Owing to the importance of this signal and to the frequency with which it is used, I prefer to construct the transmitting apparatus, so that when the box door is open and the pointer $a^{37}$ co-operates with the indication marked 1, the wagon call will be transmitted when the hook $a^{12}$ is actuated. To accomplish this result, I have provided the break wheel shaft $a^9$ with the auxiliary wheel $a^5$ having on its periphery the two substantially long dashes or breaks marked 10 in Figs. 11 and 12, and have connected the pen $b^{80}$ co-operating with the auxiliary wheel $a^5$, by the wire $b^{34}$ to the circuit terminal segment $b'$ marked 1. With the apparatus in the condition just described, that is, with the box door open, and the pointer $a^{37}$ registering with the indication marked 1 on the dial, and the circuit terminal pens or brushes $b^5$ $b^6$ in engagement with the circuit terminal strip $b$ and segment $b'$ marked 1, the signal transmitted consists of the box number indicated by a series of substantially short marks on the register tape plus two substantially long marks or dashes made by the breaks 10 in the wheel $a^5$, which signal would indicate a wagon call, but if desired the relative positions of the break wheel $a^5$ and break wheels $a^2$ $a^3$ $a^4$ may be changed so that the breaks 10 may precede the box number. The circuit over which the wagon call is transmitted with the metallic circuit wires unbroken, may be traced in Fig. 11 as follows, viz: from the positive pole of the battery B by wire $b^{10}$, relay $b^{12}$, wire $b^{13}$, circuit terminal strip $b$, contact brushes $b^5$ $b^6$, terminal strip $b'$ marked 1, wire $b^{34}$, auxiliary wheel $a^5$, shaft $a^9$, wheel $a^2$, contact pen $b^{20}$, wire $b^{19}$, switch $d^{18}$, wire $b^{16}$, relay $b^{15}$, and wire $b^{14}$, to the negative pole of the battery. The impulses or breaks made by the teeth on the wheel $a^2$, are of such duration that they do not demagnetize the relay $b^{12}$ but do demagnetize the relay $b^{15}$, whereas the breaks or notches 10 are of sufficient length to momentarily demagnetize the relay $b^{12}$ in addition to demagnetizing the relay $b^{15}$, so that the relay $b^{15}$ alone responds to the main portion of the signal when transmitted with the box door open, that is, to the box number, and both respond to the auxiliary portion of the signal, namely, to the breaks or notches 10 in the auxiliary wheel. The wagon signal as herein indicated, is received upon the tape of the register in a series of substantially short marks followed by two substantially short dashes longer than the marks comprising the main signal, but shorter than the marks comprising the fire signal as represented in Fig. 14, and the said wagon signal is also received upon the audible signal receiving instrument or bell $d^{10}$, while only the auxiliary signal transmitted by the breaks 10 in the signal wheel $a^5$ are received upon the audible signal receiving instrument or bell $d^7$, which being preferably a louder tone bell than the bell $d^{10}$ gives notice to the operator that an important signal requiring immediate attention has been received and also designates what important signal has been received. The signal transmitting mechanism is also provided as herein shown with the auxiliary wheels $a^6$, $a^7$, $a^8$, the auxiliary wheel $a^6$, being provided with one substantially long break marked 12 in Figs. 11 and 12, the wheel $a^7$ with one substantially short break 13, and the wheel $a^8$ with two substantially short breaks 14, substantially widely separated. The auxiliary wheel $a^6$ is connected as has been described, to the circuit terminal $b'$ marked 2, and is brought into circuit when the pointer $a^{37}$ is moved to the indication marked 2, the contact brushes $b^5$ $b^6$ being at such time in engagement with the contact strip $b$ and the contact strip $b'$ marked 2.

The signal indicated by the box number in substantially short impulses together with the substantially long break 12 made by the wheel $a^6$ may and preferably will indicate a telephone signal, see Fig. 14, and the signal produced by the box number in substantially short impulses together with the substantially short break 13 in the wheel $a^7$, which is brought into circuit by the officer or other duly authorized person turning the pointer to register with the indication marked 3 on the dial, and thereby bring the contact brushes $b^5$ $b^6$ into engagement with the circuit terminal strip $b'$ marked 3 and the circuit terminal strip $b$, may indicate the route or post number of the officer, which in this present case would be route No. 1. See Fig. 14. The pointer $a^{37}$ may be still further turned to register with the indication marked 4 on the dial, and bring the contact brushes $b^5$ $b^6$ into engagement with the circuit terminal strip $b$ and the circuit terminal strip $b'$ marked 4, thereby including the auxiliary wheel $a^8$ in the electric circuit, the signal produced being represented by the box number in substantially short impulses together with two substantially short dashes made by the breaks 14, which would indicate that a police officer on route 2 was reporting at the box. When the telephone signal is transmitted, the complete signal including the box number, and the substantially long break 12, is received upon both the register R and the bell $b^{10}$, and only the auxiliary signal or break 12 is received upon the bell $d^7$. The route or post signals, including the box number in substantially short impulses together with the short breaks 13 or 14, operate the fast relay $b^{15}$ and do not operate the slow relay $b^{12}$, and the said signals are received only on the register R and bell $d^{10}$, which latter in practice is preferably of softer tone than the bell $d^7$, and the bell $d^7$, is clearly distinguished from the bell $d^{10}$.

The pointer $a^{37}$ may be turned to register with the indication marked 5 on the dial $A^4$, thereby moving the contact brushes $b^5$ $b^6$ and bringing the brush $b^6$ into engagement with the terminal strip $b'$ marked 5, which is connected by wire $f$ with the branch wire $b^{25}$ joined to the contact spring $b^{24}$ co-operating with the break wheel $a^4$. If the hook should be pulled with the pointer $a^{37}$ in register with the indication marked 5, the box number alone would be transmitted to the central station in a series of short impulses as represented in Fig. 14, and would be received upon the register R and bell $d^{10}$. The box number alone in a series of short impulses may and preferably will indicate a test signal, whereby the fire alarm part of the signal transmitting mechanism is tested and maintained in good electrical and mechanical condition without sounding a fire alarm.

The circuit for the test signal may be traced as follows, viz: from the positive pole of the battery B, by wire $b^{10}$, relay $b^{12}$, wire $b^{13}$, terminal strip $b$, contact brushes $b^5$ $b^6$, terminal strip $b'$ marked 5, wires $f$, $b^{25}$ and pen $b^{24}$ to break wheel $a^4$, through the said break wheel, shaft $a^9$, break wheel $a^2$, wire $b^{19}$, switch $b^{18}$, wire $b^{16}$, relay $b^{15}$ and wire $b^{14}$ to the negative pole of the battery.

It will thus be seen that the important signals such as the wagon and telephone calls, are readily distinguished audible from the route signals, and in addition are clearly distinguished audible from each other. It will be noticed that when the pointer has been moved to register with any other indication than the normal or zero indication, the signal or number indicative of the box is transmitted in a series of substantially short impulses or characters, but that when the pointer is in its normal or zero position, the signal or number indicative of the box is transmitted in a series of substantially long impulses.

When the signal or box number is transmitted in a series of substantially long impulses, the signal produced will actuate both the fast and slow relay, and will sound the bells $d^7$, $d^{10}$, and in practice the bell $d^7$ will preferably be made of a much louder tone than the bell $d^{10}$ to clearly distinguish the fire alarm signals from the police alarm signals received upon the bell $d^{10}$.

In order to prevent the pointer $a^{37}$ from being moved back into its normal position, in register with the 0 indication, on the dial, while the box door is open, the finger $c^8$ is made of sufficient length to engage with the projection $c^9$ on the pointer before the pointer can be brought to the 0 indication, and preferably the finger $c^8$ will engage with the projection $c^9$ when the pointer registers with the indication marked 1 on the dial.

While the box door remains open, the slide bar $c$ and its finger $c^8$ are practically immovable in the direction indicated by the arrow 40, in Fig. 4, and consequently the finger $c^8$ acts as a stop to limit the backward or return movement of the pointer to its normal position. When the box door is being closed, the slide bar $c$, is moved in the direction indicated by the arrow 50, see Fig. 4, and the finger $c^7$ acts on the projection $c^9$, and moves the same backward or in the direction indicated by the arrow 50, and thereby turns the pointer back into coincidence with the 0 indication on the dial, that is, into its normal position when the door is closed. The finger $c^7$ is preferably made movable, and when the pointer $a^{37}$ is moved back toward its normal position, the stud or pin $c^9$ carries the said finger upward until the said stud clears the same and occupies a position between it and the finger $c^8$. This construction enables me to make the finger $c^7$ long enough to positively engage the stud $c^9$ and thereby avoid any possible danger of the slide bar $c$ being moved, when the door is closed, without moving the pointer back into its normal position.

When the box or transmitting apparatus is used as a police box, I prefer that but a single round of the signal should be transmitted to the central station, and to accomplish this result, I have provided a suitable stopping device for the downward movement of the pull bar $a^{23}$. One form of stopping device referred to, may be made as shown in Fig. 8, in which the dial $A^4$ in the line with the slide therein, has pivoted to it as it has at $c^{50}$, a dog $c^{51}$ acted upon by a spring $c^{52}$, the said dog being removed out of the path of movement of the hook $c^{12}$ and pull bar $a^{23}$, when the box door is closed, by means of a projection $c^{53}$ secured to or forming part of the casing $c^{15}$.

When the box door $A'$ is open, the projection $c^{53}$ is removed from engagement with the pivoted dog $c^{51}$, and the latter is brought by the spring $c^{52}$ into the path of movement of the hook $c^{12}$, to limit the downward movement of the pull bar $a^{23}$, the pivoted dog $c^{51}$ being preferably made of such length, that the pull bar $a^{23}$, when the hook $c^{12}$ is actuated, will engage the said dog after the pull bar has been moved a sufficient distance to actuate the transmitting mechanism to produce one complete round of the signal.

As herein shown and described, the circuit closing arm $d^{20}$ of the transmitting mechanism, is arranged to engage the circuit terminals $d^{22}$ $d^{23}$ and close the ground tap at the box when the hook $c^{12}$ has been moved to the end of its slot, that is, when it has been moved a sufficient distance to transmit three rounds of the signal, and as thus arranged the ground tap at the box is not closed when the hook is pulled to send in a police signal. I prefer this arrangement but I do not desire to limit myself in this respect, as it is evident that the arm $d^{20}$ may be so arranged, as to close the circuit terminals $d^{22}$ $d^{23}$ on the last round of the fire signal, which would be the same as the single round of the police signal, and in this latter case, the police signals might be received at the central station or office in case of a break in either of the line wires. For example, if one of the line wires should be broken, as for instance, the line wire $b^{19}$, it being broken at the point $d^{15}$ Fig. 12, a police signal, as for instance the wagon call would be received over the other side of the line, that is, over the line wire $b^{13}$, substantially in the same manner as previously described in connection with the main fire alarm signal. The circuit for the wagon signal may be traced as follows, viz: from the positive pole of the battery B by wire $b^{10}$, relay $b^{12}$, wire $b^{13}$, circuit terminal strip $b$, brushes $b^5 b^6$, circuit terminal strip $b'$ marked 1, wire $b^{34}$, auxiliary wheel $a^5$, shaft $a^9$, break wheel $a^3$, contact pen $b^{23}$, wire $d^{25}$, circuit terminals $d^{22}$, $d^{23}$, wire $d^{26}$, ground G, thence to the ground G', wire $d^{44}$, switch $d^{32}$, wire $d^{46}$, terminal stud $b^{17}$, wire $b^{16}$, relay $b^{15}$, and wire $b^{14}$ to the negative pole of the battery.

The pointer $a^{37}$ is preferably provided with a hole or opening $d$, with which co-operates a stud or post $d'$ on the inside of the door $A'$, when the pointer is in its normal position and the box door is closed, the said stud or post being adapted to strike against the pointer and prevent the door $A'$ being closed, until the pointer is in its normal position. This is of considerable importance practically, as the officer after reporting an "on duty" call, may forget to turn the pointer back, so that the stud or projection $c^9$ will be engaged by the finger $c^7$. For instance, the officer may have turned the pointer into the position shown in Fig. 5 to send in an "on duty" call, and might forget to turn the pointer as above described. In this case, an attempt to shut the door with the pointer in the position shown in Fig. 5, would cause the stud or post $d'$ on the inside of the door to strike against a solid portion of the pointer and prevent the door being closed.

When the fire alarm signal is being transmitted it is important that the said signal should not be capable of being changed as by opening the box door, as in this case the whole or part of the signal would be transmitted in a series of quick or short impulses, which would be confusing to the operator in the central office, and also it is of very great importance that the change in the signal from a police signal of quick impulses to a fire signal of long impulses should not occur after the mechanism had been operated to transmit a police signal.

To prevent the fire signal of long impulses being changed to a police signal of short impulses by opening the box door after the signal has been pulled, and also to prevent the police signal being changed into a fire signal as described, I have provided a stopping or locking device for the door, which is herein shown as a bar or finger $h$ secured to or forming part of the operating hook, the said bar or finger in the present instance performing the double function of preventing the box door being opened when the hook has been moved from its normal position, and of preventing the box door being closed after the said hook has been pulled with the box door open. The stopping device or finger $h$ in the normal position of the box, that is, with the box door closed, registers with a substantially horizontal notch $h'$ in the back of the auxiliary casing $c^{15}$. When the box door is closed and the hook is in its normal position, the finger or stop $h$ lies within the auxiliary casing in line with the notch $h'$, and when the glass is broken and the hook operated to send in a fire alarm, the stop or finger $h$ is carried down out of line with the notch $h'$, and if it is attempted to open the box door after the hook has been pulled down to send in a fire signal, the back of the casing $c^{15}$ engages the back of the stop or finger $h$ and prevents the door being opened, the back of the finger $h$ forming a front stop for the door. When the hook is in its normal position, the box door may be opened to transmit a police signal, as above described, but if it is attempted to shut the box door while the police signal is being transmitted, as might happen in practice owing to the carelessness of an officer, who might think his signal had been sent, it will be seen that the front of the finger or stop $h$, being out of line with the notch $h'$, as long as the hook is out of its normal position, will be engaged by the back of the auxiliary casing as represented in Fig. 15, and thus prevent the door being shut sufficiently far to change the police signal into a fire signal, the front end of the finger $h$ constituting a back stop for the door.

I prefer the construction shown and described for preventing the change in signals described, but I do not desire to limit my invention to the particular construction shown. With the construction herein shown, it will be noticed that both relays respond to the fire signal transmitted in substantially long impulses, and consequently if the relay $b^{12}$ should become inoperative from any cause, the fire alarm signal would be still received upon the fast relay $b^{15}$, and would be received upon the register R and the bell $d^{10}$, and would be readily distinguished audibly from the police signals. So also it will be noticed that the signal is received upon the bell $d^{10}$ independent of the register R, and that the bell $d^{10}$ constitutes a safe guard, that is, all the signals are audibly tapped off or sounded on this bell.

The importance of the bell $d^{10}$ may be readily comprehended, as it is all important that when an important signal, such as a fire alarm, or a wagon or telephone signal is transmitted, it should be received at the central office. In other signaling systems as now commonly constructed and known to me, there is but one chance offered for receiving the signal over the metallic circuit, and if a portion of the receiving apparatus becomes inoperative, the signal is lost, whereas by the construction of receiving apparatus herein shown, which is substantially the same in principle as that shown and described in United States Patent No. 472,983, granted to me April 19, 1892, the fire alarm signal has three chances of being received, viz: first, upon the bell $d^7$; second, upon the register R, and, third, upon the bell $d^{10}$, so that in case the bell $d^7$ becomes inoperative it may yet be received upon the register R and bell $d^{10}$, and if both the bell $d^7$ and register R should become inoperative it will still be received upon the bell $d^{10}$. In police signaling the register R and bell $d^{10}$ receive all signals, and in case the register becomes inoperative, the signal is received on the bell $d^{10}$.

I claim—

1. In a signal transmitting apparatus, the combination of the following instrumentalities, viz.—a box or case provided with a door, a signal transmitting mechanism located therein and constructed and arranged to transmit a signal or number indicative of the said box or transmitting apparatus in two distinct sets of characters, and operatively connected to the box door to be automatically changed by the act of opening the door to place the signal transmitting mechanism in condition to transmit the box number in a different set of characters from that in which it is transmitted with the box door closed, substantially as described.

2. In a signal transmitting apparatus, the combination of the following instrumentalities—viz.—a box or case provided with a door, a signal transmitting mechanism located therein and capable of transmitting distinguishable signals, and an intermediate connection positively joining the said door and signal transmitting mechanism, whereby the said signal mechanism is automatically operated by the act of opening the box door to place it in condition to transmit a signal distinguished from the signal when transmitted with the box door closed, substantially as described.

3. In a signal transmitting apparatus, the combination of the following instrumentalities,—viz.—a box or case provided with a door, a signal transmitting mechanism located in said box and capable of transmitting a signal or number indicative of the said box or transmitting apparatus in two distinct sets of characters, and an intermediate connection joining the box door with the signal transmitting mechanism, whereby the signal or number may be transmitted in one set of characters when the door is closed and in a different or distinguishing set of characters when the box door is opened, substantially as described.

4. In a signal transmitting apparatus, the combination of the following instrumentalities—viz.—a box or case provided with a door, a signal transmitting mechanism located therein and capable of transmitting distinguishing signals, a pointer to select the said signals, and an intermediate connection joining the said pointer to the box door, whereby the pointer may be automatically operated by the opening of the box door, for the purpose specified.

5. In a signal transmitting apparatus, the combination of the following instrumentalities—viz.—a box or case provided with a door, a signal transmitting mechanism located therein and capable of transmitting distinguishable signals, and an intermediate connection positively joining the said door and signal transmitting mechanism, the said intermediate connection being capable of detachment from the signal transmitting mechanism after the box door is open, substantially as described.

6. In a signal transmitting apparatus, the combination of the following instrumentalities—viz.—a box or case provided with a door, a signal transmitting mechanism located therein and capable of transmitting distinguishable signals, a pointer to select the said signals, and an intermediate connection joining the said pointer to the box door and constructed to permit the pointer to be moved in one direction after the door is opened and to limit its movement in a reverse direction, substantially as described.

7. In a signal transmitting apparatus, the combination of the following instrumentalities—viz.—a box or case provided with a door, a signal transmitting mechanism located therein and capable of transmitting distinguishable signals, a pointer to select said signals operatively connected to said door to be moved automatically from its normal position with the door closed to a different position by the act of opening the door, substantially as described.

8. In a signal transmitting apparatus, the combination of the following instrumentalities—viz.—a box or case provided with a signal transmitting mechanism constructed to transmit its signal in two different sets of characters, an actuating device or hook for said transmitting mechanism, a door for said box or case constructed to permit of access to the said actuating device when the said door is closed, and a front stop or locking device to prevent the box door being opened after the actuating device has been moved from its normal position but which permits the said door to be opened when the actuating device is in its normal position, substantially as described.

9. In a signal transmitting apparatus, the combination of the following instrumentalities—viz.—a box or case provided with a signal transmitting mechanism constructed to transmit its signal in two different sets of characters, an actuating device or hook for said transmitting mechanism, a door for said box or case constructed to permit of access to the said actuating device when the said door is closed, and a back stop to prevent the box door being closed after the actuating device has been moved from its normal position with the box door open but which permits the door to be closed when the actuating device is in its normal position, substantially as described.

10. In a signal transmitting apparatus, the combination of the following instrumentalities—viz.—a box or case provided with a signal transmitting mechanism, an actuating device or hook $c^{12}$ for said signal transmitting mechanism, a door for said box or case, an auxiliary case or frame secured to or forming part of the inner side of the box door, and into which the actuating device or hook $c^{12}$ extends when the box door is closed, and a frangible covering $c^{14}$, forming part of the box door and normally rendering the actuating device $c^{12}$ inaccessible, substantially as described.

11. In a signal transmitting apparatus, the combination of the following instrumentalities—viz.—a box or case provided with a signal transmitting mechanism, an actuating device or hook $c^{12}$ for said signal transmitting mechanism, a door for said box or case, an auxiliary case or frame secured to or forming part of the inner side of the box door, and into which the actuating device or hook $c^{12}$ extends when the box door is closed, a frangible covering $c^{14}$ forming part of the box door and normally rendering the actuating device $c^{12}$ inaccessible, a stopping device to co-operate with the actuating device or hook, and limit its downward movement, when the box door is open, and means to render the stopping device inoperative when the box door is closed.

12. In a signaling system, the combination of the following instrumentalities—viz.—a box or case provided with a signal transmitting mechanism, a metallic circuit connecting the said mechanism to a central station or office, a main line battery included in said metallic circuit, a receiving instrument or relay in said metallic circuit, a normally open local circuit controlled by said relay, a switch or circuit controller, to open the said local when permanently closed as by a break in the metallic circuit, a normally open ground branch at the central station, a switch $b^{18}$ to control the same, a ground branch at the transmitting box, and a signal transmitting surface or break wheel co-operating with said ground branch, substantially as described.

13. In a signaling system, the combination of the following instrumentalities—viz.—a box or case provided with a signal transmitting mechanism, a metallic circuit connecting the said mechanism to a central station or office, a main line battery included in said metallic circuit, a receiving instrument or relay in said metallic circuit, a normally open local circuit controlled by said relay, a switch or circuit controller, to open the said local when permanently closed as by a break in the metallic circuit, a normally open ground branch at the central station, a switch $b^{18}$ to control the same, a normally open ground branch at the transmitting box, a signal transmitting surface or break wheel co-operating with the normally open branch at the box or apparatus, normally open circuit terminals in the grounded branch at the transmitting apparatus, and a circuit controller operated by the transmitting mechanism to close the normally open circuit terminals of the grounded branch, substantially as described.

14. In a signaling system, the combination of the following instrumentalities—viz.—a signal transmitting apparatus or box, a central station or office, a metallic circuit provided with a battery connecting said box and central office, a normally open ground branch at the transmitting apparatus or box adapted to be automatically closed when the signal transmitting apparatus is operated, a receiving instrument or relay in the metallic circuit at the central station or office, a normally open local circuit controlled by said relay, a switch in said local circuit to open the said local circuit when the latter is closed by the relay in case of a break in the metallic circuit, a normally open ground branch at the central station, and a switch to close said ground branch, whereby the local circuit controlled by the relay in the metallic circuit may be employed and controlled by said relay when included in the ground circuit, and the main line battery may be employed without change, substantially as described.

15. In a signaling system, the combination of the following instrumentalities—viz.—a signal transmitting apparatus or box provided with a series of main signal wheels or surfaces $a^2$ $a^4$ connected to opposite sides of a metallic circuit, a like break wheel $a^3$ co-operating with a ground branch circuit, and auxiliary signaling wheels or surfaces having distinguishable teeth or notches, a circuit controller in said box or apparatus consisting of a circuit terminal $b$ to which one line wire of the metallic circuit is connected, a series of circuit terminals $b'$ to one of which one line of the metallic circuit is connected and to the others of which the auxiliary signaling wheels are connected, and contact arms or brushes co-operating with and electrically connecting the terminal strip $b$ with one of the strips $b'$, relays $b^{12}$ $b^{15}$ included in the metallic circuit at a central station, normally open local circuits, D D' controlled by the armatures of the said relays, signal receiving instruments in said local circuits, back stops $d^4$ $d^5$ for the said armatures, switches $d^{30}$ $d^{31}$ normally connected to said back stops, front stops $d^{39}$ $d^{43}$ for said armatures with which the switches $d^{30}$ $d^{31}$ are adapted to be connected when disconnected from the back stops $d^4$ $d^5$, a normally open ground branch at the central station, a switch $d^{32}$ to connect the said ground branch with the metallic circuit, and a switch $b^{18}$ in the metallic circuit, to operate, substantially as described.

16. In a signal transmitting apparatus, the combination of the following instrumentalities—viz.—a box or case provided with a signal transmitting mechanism, an actuating device or hook $c^{12}$ for said transmitting mechanism, a door for said box or case, an auxiliary case or frame secured to or forming part of the inner side of the box door and having its back wall provided with a substantially vertical slot through which the actuating device or hook is extended and with a substantially horizontal notch extended from the said vertical slot, a combined front and back stopping device or finger secured to the actuating device or hook and normally registering with the said horizontal slot, and means to permit of access to the said actuating device or hook when the box door is closed, substantially as described.

17. In a signal transmitting apparatus, the combination of the following instrumentalities—viz.—a box or case provided with a door, a signal transmitting mechanism located in said box and constructed and arranged to transmit a signal or number indicative of the box at different speeds, a pointer to effect the change in the speed of the signal, and an intermediate connection joining said pointer to the box door, whereby the act of opening the box door automatically changes the position of the pointer to change the condition of the signal transmitting mechanism, so that the signal or box number may be transmitted with the box door open at a different speed from that in which it is transmitted with the box door closed, substantially as described.

18. In a signal transmitting apparatus, the combination of the following instrumentalities, viz.—a box or case provided with a normally closed door, a signal transmitting mechanism in said box constructed and arranged to transmit one kind of signals with the box door closed and another kind with the box door open, an actuating device for said transmitting mechanism, and means operated by the actuating device to prevent the box door being opened or closed while a signal is being transmitted, substantially as described.

In testimony whereof I have signed my name to this specification in the presence of two subscribing witnesses.

HENRY A. CHASE.

Witnesses:
JAS. H. CHURCHILL,
J. MURPHY.